United States Patent [19]
Droescher et al.

[11] Patent Number: 4,760,115
[45] Date of Patent: Jul. 26, 1988

[54] HIGH IMPACT THERMOPLASTIC MOLDING MATERIAL BASED ON MODIFIED POLYPHENYLENE ETHERS, POLYOCTENYLENES AND POLYAMIDES

[75] Inventors: Michael Droescher, Dorsten; Hans Jadamus, Marl, both of Fed. Rep. of Germany

[73] Assignee: Hüls Aktiengesellschaft, Marl, Fed. Rep. of Germany

[21] Appl. No.: 31,845

[22] Filed: Mar. 30, 1987

[30] Foreign Application Priority Data

Jun. 28, 1986 [DE] Fed. Rep. of Germany ....... 3621805

[51] Int. Cl.$^4$ ............................................. C08L 71/04
[52] U.S. Cl. .................... 525/132; 525/149; 525/152; 525/391; 525/397; 524/508
[58] Field of Search ............... 525/132, 133, 152, 149, 525/391, 397, 181

[56] References Cited

U.S. PATENT DOCUMENTS 4,315,086 2/1982 Ueno et al. .......................... 525/391
4,647,613 3/1987 Jadamus et al. ...................... 525/92
4,656,220 4/1987 Jadamus et al. .................... 525/132

FOREIGN PATENT DOCUMENTS 0181449 8/1985 European Pat. Off. .

*Primary Examiner*—John C. Bleutge
*Assistant Examiner*—A. Carrillo
*Attorney, Agent, or Firm*—Oblon, Fisher, Spivak, McClelland & Maier

[57] ABSTRACT

The invention relates to thermoplastic materials having the following components:
(a) 5-85 parts by weight of a melted or remelted preforming material comprising
  (i) 60-98 parts by weight of a polyphenylene ether,
  (ii) 40-2 parts by weight of a polyoctenylene, and
  (iii) 1-7.5 parts by weight of bicyclo [2.2.2]-2,3:5,6-dibenzooctadiene-2,5-dicarboxylic acid-7,8-anhydride, and
(b) 95-15 parts by weight of a polyamide comprising an aliphatic homopolyamide or a copolyamide and optionally
(c) polystyrene resins, flame protection agents, and other additives, and to a method for their manufacture.

15 Claims, No Drawings

HIGH IMPACT THERMOPLASTIC MOLDING MATERIAL BASED ON MODIFIED POLYPHENYLENE ETHERS, POLYOCTENYLENES AND POLYAMIDES

BACKGROUND OF THE INVENTION

1. Field of the Invention

The invention relates to high impact thermoplastic molding materials comprising modified polyphenylene ethers, polyoctenylenes and polyamides.

2. Discussion of the Background

Polyphenylene ethers (PPE) are technical high-performance thermoplastics with high melting viscosities and softening points. They are suitable for numerous technical applications in which durability at high temperatures is important (see U.S. Pat. Nos. 3,306,874; 3,306,875; 3,257,357 and 3,257,358).

Certain characteristics of polyphenylene ethers are undesirable for technical applications. For example, molded elements made from polyphenylene ethers are brittle because of their poor impact resistance. Also disadvantageous are the high melting viscosities and softening points which lead to difficulties in handling. It must also be considered that polyphenylene ethers tend to discolor and are unstable at high temperatures. Polyphenylene ethers are soluble in many organic solvents or swell exceedingly. This results in their being unsuitable for applications in which they come into contact with such solvents.

It is known that the characteristics of PPE can be improved by mixing it with other polymers. Thus, for example, mixtures with high impact polystyrenes have achieved great technical significance (see DE-PS No. 21 19 301 and PS No. 22 11 005). These mixtures can be easily made into molded elements with sufficient impact resistance, but exhibit the disadvantage that as the polystyrene content increases, its ability to withstand hot forming decreases. The resistance of these mixtures to solvents is also unsatisfactory.

Mixtures of polyphenylene ethers with polyamides do have good flow capability and also good solvent resistance (DE-AS No. 16 94 290, JP-A No. 78 47 390). However, the resulting products are generally brittle, because the two components are incompatible and therefore disperse through each other poorly. Aromatic polyamides, such as those employed, for example, according to EP-OS No. 0 131 445 also work poorly with polyphenylene ethers. Better compatibility of the two phases is achieved through a functionalization of the polyphenylene ether, for example with maleic anhydride in the presence of radical initiators (JP-OS No. 84/066 452). The use of radical initiators, however, leads to an undesirable and uncontrolled partial gelling of the PPE-phase.

It has therefore been suggested to increase the compatability of both polymers by adding an adequate quantity of a liquifying agent, such as an organic phosphate (see EP-OS No. 0 129 825) or a diamide (see EP-OS No. 0 115 218). Such solutions are not adequate, however, because the improved compatability must be obtained at the cost of significantly reduced hot forming resistance. Molding materials to which copolymers of styrene and unsaturated acid derivatives have been added have the same disadvantage (see EP-OS No. 0 046 040).

The object of EP-PS No. 0 024 120 is resin materials consisting of a polyphenylene ether, a polyamide, a third component and perhaps high-molecular weight caoutchouc polymers. A liquid diene polymer, an epoxide or a compound with a double or triple bond and a functional group such as an acid, anhydride, ester, amino or alcohol group is employed as the third component. The strength of the resultant resin material, however, is inadequate for many applications.

Finally, German Patent Application No. P 35 45 249.8 discloses high impact thermoplastic materials from a remelted preforming material, a primarily aliphatic polyamide and other additives. The preforming material consists of polyphenylene ethers, polyoctenylenes, maleic anhydride and other acid components having a melting point below 100° C. A disadvantageous of this method is that the maleic anhydride and the other acid components must be heated to such an extent that a uniform molten mass of the four components is produced. This results in potential health hazards.

SUMMARY OF THE INVENTION

Accordingly, one object of the present invention is to provide high impact thermoplastic molding materials which have high strength and good phase bonding.

Another object of the invention is to provide thermoplastic molding materials which have high resistance to solvents and a high resistance to hot forming.

A further object of the invention is to provide thermoplastic molding materials comprised of modified polyphenylene ethers, polyoctenylenes and polyamides which have high strength, good phase bonding, high resistance to solvents and high resistance to hot forming.

These objects and other objects of the present invention have been achieved by the theromplastic molding material of the present invention, comprising:

(a) 5–85 parts by weight of a melted or remelted preforming material comprising
  (i) 60–98 parts by weight of a polyphenylene ether,
  (ii) 40–2 parts by weight of a polyoctenylene, and
  (iii) 1–7.5 parts by weight of bicyclo [2.2.2]-2,3:5,6-dibenzooctadiene-2,5-dicarboxylic acid-7,8-anhydride, and (b) 95–15 parts by weight of a polyamide comprising an aliphatic homopolyamide or a copolyamide.

DETAILED DESCRIPTION OF THE PREFERRED EMBODIMENTS

The object of the present invention is to produce solvent-resistance molding materials based on polyphenylene ethers (PPE) and easily hand able polyamides, which are characterized by high strength, good phase bonding (recognizable by high elongation tear values), a high resistance to solvents, and a high resistance to hot forming.

Molding materials have now been found which satisfy these requirements. They consist of:

(a) 5 to 85 parts by weight, preferably 20 to 50 parts by weight, of a melted or remelted preforming material having the following composition:
  60 to 98 parts by weight PPE
  40 to 2 parts by weight polyoctenylene
  1 to 7.5 parts by weight of bicyclo[2.2.2]-2,3:5,6-dibenzooctadiene-2,5-dicarboxylic acid-7,8-anhydride, (b) 95 to 15 parts by weight, preferably 80 to 50 parts by weight, of an aliphatic homopolyamide or a copolyamide, and (c) optionally, polystyrene resins, flame protection agents and other additives.

It has now been discovered that excellent elongation tear values and notched bar impact values are obtained if the PPE phase is so dispersed in the polyamide matrix that the linear average of the volume distribution $D = (\text{Sigma } N_i D_i^4)/(\text{Sigma } N_i D_i^3) < 2$ μm. Here, $D_i$ stands for the diameter of the particles and $N_i$ indicates the number of particles with the diameter $D_i$.

The method for producing these materials is distinguished by the fact that the solid mixture of the polyphenylene ether and the polyoctenylene is first treated with bicyclo[2.2.2]-2,3:5,6-dibenzooctadiene-2,5-dicarboxylic acid-7,8-anhydride, whereupon the mixture is melted and then the polyamide and any other components are added.

Molding materials with particularly high elongation tear and notched bar impact values can be obtained when the molding materials are used at a maximum of 50 parts by weight.

Thermoplastic materials within the scope of the invention are mixtures which can be handled through thermoplastic processing into molded elements or into semi-finished products. For example, the thermoplastic materials may take the form of granules. What is important is that the preforming materials are melted or re-melted prior to their use in the thermoplastic materials.

The preferred polyphenylene ether is a polyether based on 2,6-dimethylphenol, whereby the ether oxygen of one unit is bonded to the benzene ring of the adjacent unit. At least 50 such units should be bonded together.

Other o,o'-dialkylphenols are also suitable. The alkyl groups have preferably no more than 6 carbon atoms and should not have a tertiary carbon atom in the alpha-position. Also suitable are phenols which are substituted only in an ortho position by a tertiary alkyl group, particularly a tertiary butyl group. Each of the monomeric phenols can be substituted in the 3 position, and perhaps also in the 5 position, by a methyl group. Of course, mixtures of the monomeric phenols can also be employed.

The polyphenylene ethers can be produced, for example, in the presence of complex-forming agents, such as copper bromide and morpholine (see DE-OS No. 32 24 692 and OS No. 32 24 691). The viscosity values, determined in accordance with DIN 53 728 in chloroform at 25° C., lie in the range of 35 to 80 cm$^3$/g. The polymer of the 2,6-dimethylphenol, the poly-(2,6-dimethyl-1,4-phenylene ether), with an intrinsic viscosity of 0.3 to 0.65 cm$^3$/g is preferred. The polyphenylene ethers are generally employed as a powder or granulate.

The polyoctenylenes are manufactured by the ring-opening or ring-expanding polymerization of cyclooctene. See, for example, A. Draxler, Kautschuk+Gummi, Kunststoffe, pages 185 to 190 (1981). Polyoctenylenes with different proportions of cis and trans double bonds, as well as different J-values and resultant different molecular weights, can be obtained through methods known in the literature. Polyoctenylenes with a viscosity value of 50 to 350 cm$^3$/g, preferably 80 to 160 cm$^3$/g, determined in a 0.1% solution in toluene, are preferred. 55 to 95%, preferably 75 to 85%, of its double bonds should be in the trans-form.

There are various embodiments for producing a mixture of polyphenylene ether and polyoctenylene. One possibility is to dissolve both polymers in a suitable solvent and to isolate the mixture by evaporating the solvent or through precipitation with a non-solvent. Another possibility is to combine the two polymers in the molten material. For further details, reference is made to German patent application No. P 34 36 780.2 "Thermoplastische Massen auf Basis von Polyphenylenethern und Polyoctenylenen sowie Verfahren zu ihrer Herstellung."

The powdered bicyclo[2.2.2]-2,3:5,6-dibenzooctadiene-2,5-dicarboxylic acid-7,8-anhydride can, for example, be tumbled onto the PPE/polyoctenylene granules in a laboratory mixer, or be dosed directly into the PPE-polyoctenylene melt.

What is important is that the thus-obtained material is melted once and, either in this melted form or after its solidification into solid form, it is combined with the polyamide and, if required, the other components.

Suitable as polyamides are homo- and copolymers preferably having an exclusively aliphatic structure. Worthy of particular mention in this regard are the 6-, 46-, 66-, 612-, 11- and 12-polyamides. Also suitable, however, are mixed aliphatic-aromatic copolyamides, provided that the proportion of underlying aliphatic components is predominant (see U.S. Pat. Nos. 2,071,250; 2,130,523; 2,130,948; 2,241,322; 2,312,966; 2,512,606; 3,393,210; Kirk-Othmer, Encyclopedia of Chemical Technology, Vol. 18, John-Wiley & Sons (1982), pages 328–435). The numerical average of the molecular weight of the polyamides lies above 5,000, and preferably above 10,000.

The combination of the polyamides with the preforming material takes place, for example, by mixing the two molten materials into a well kneaded aggregate at 250° to 350° C., preferably at 270° to 310° C. It is preferable to premix the two components while dry and then extrude them, or to dose the polyamide into the melt of the PPE preforming material.

95 to 15 parts by weight of polyamide are employed relative to 5 to 85 parts by weight of the preforming material. Preferably, 80 to 50 parts by weight of polyamide are used with 20 to 50 parts by weight of the preforming material.

The molding materials can also contain unmodified or impact strength modified polystyrene resins. To achieve the desired high hot forming resistance, molding materials are generally employed having a low content of these resins. The maximum quantity of polystyrene resin used is 50% by weight, and preferably a maximum of 20% by weight, relative to the quantity of polyphenylene ether is employed.

The thermoplastic materials according to the invention can also contain a fire retardant, as well as additional additives such as pigments, oligomers, polymers, antistatic agents, stabilizers, processing aids, and reinforcing agents. The proportion of reinforcing agents can be as high as 50%, that of the flame protection agents can be as high as 15%, and that of all other additives can total as high as 5%, each relative to the total molding material.

Particularly suitable as flame protection agents are aromatic phosphorus compounds such as triphenyl phosphine oxide and triphenyl phosphate. A common halogen-containing flame protection agent can also be used. Examples include organic compounds containing halogen, such as are described in the monograph of H.Vogel, "Flammfestmachen von Kunststoff," Huethig Verlag pages 94–102 (1966). Also suitable, however, are halogenated polymers, such as halogenated polyphenylene ether (see DE-OS No. 33 34 068) or brominated oligostyrenes or polystyrenes. The compounds should contain more than 30% by weight of halogen.

When halogen-containing flame protection agents are employed, it is recommended that a synergist be used. Compounds of antimony, boron and tin are suitable. These are used generally in quantities of 0.5 to 10% by weight, relative to the thermoplastic material.

Glass and carbon fibers are suitable as reinforcing agents.

Suitable stbilizers include organic phosphites, such as di-decylphenyl phosphite and trilauryl phosphite, sterically hindered phenols as well as tetramethyl piperidine derivatives, benzophenone derivatives and triazole derivatives.

Suitable as processing aids are waxes, such as oxidized hydrocarbons as well as their alkali salts and alkaline-earth salts.

The obtained molding materials can be worked into molded elements by common methods for handling thermoplastics, such as injection casting and extrusion.

Examples of technical applications for the melting materials are pipes, plates, housings and other articles for the automobile, electronic and precision mechanics sectors.

The molding materials according to the invention distinguish themselves over the products of the prior art by great strength with good hot forming resistance and solvent resistance.

The viscosity value (J) of the polyphenylene ether was measured in cm$^3$/g according to DIN 53 728 at 25° C. in chloroform (concentration 0.5% by weight).

The notched bar impact strength ($a_K$) of the molding materials was measured at room temperature according to DIN 53 453 on a standard small bar injection cast at 290° C. and having a rectangular notch.

The tear elongation (epsilon$_R$) was determined according to DIN 53 455 on shoulder bars injected at 290° C.

The Vicat softening temperature according to DIN 53 699 was determined on molded elements 4 mm thick which were injection cast at 290° C.

To determine the PPE particle size, the molding material was dissolved in hexafluoroisopropanol (HFIP), in which the PPE component floats. The floating material is washed several times with HFIP, dried and studied in a scanning electron microscope. The particle diameters are determined by measuring at least 1,000 particles using photographic pictures.

Other features of the invention will become apparent in the course of the following descriptions of exemplary embodiments which are given for illustration of the invention and are not intended to be limiting thereof.

EXAMPLES

1. Polyphenylene ether

Polyphenylene ether is obtained through the oxidative coupling of 2,6-dimethylphenol, stopping of the reaction at the desired J-value and subsequent reaction extraction according to DE-OS No. 33 13 864 and OS No. 33 32 377.

EXAMPLE 1.1

A polyphenylene ether with a J-value of 48 cm$^3$/g is produced accordingly. The solvent is removed through evaporation and the melt is extruded through a degasification extruder, then granulated and dried.

EXAMPLE 1.2

A polyphenylene ether with a J-value of 48 cm$^3$/g is produced accordingly as a 10% toluene solution.

2. Polyoctenylene

A polyoctenylene with a J-value of 130 cm$^3$/g and a trans-content of 80% is used. A product of this type is commercially available under the name VESTENAMER ® 8012 (Manufacturer Huels Aktiengesellschaft, D-4370 Marl). Additional characterizing data for this product can be obtained in the publication "Kautschuk, Gummi, Kunststoffe", pages 185–190 (1981), and in the Huels Notice Sheet No. 2247 "VESTENAMER ® 8012." The polyoctenylene can also be produced, for example, in accordance with K. J. Irvin "Olefin Metathesis," Academic Press, pages 236 et seq. (1983) and the literature cited therein.

3. Mixtures of Polyphenylene Ethers and Polyoctenylene

The polyoctenylene according to Example 2 is dissolved in a solution according to Example 1.2, whereby 90 parts by weight of polyphenylene ether are mixed with 10 parts by weight of polyoctenylene. The solution is concentrated to 70%. The remaining solvent is removed by means of a degasification extruder and is granulated and dried.

4. Bicyclo-[2.2.2]-2,3:5,6-dibenzooctadiene-2,5-dicarboxylic acid-7,8-anhydride 50 g of anthracene and 27.5 g of maleic anhydride are heated in 150 ml of xylol for 3 hours under reflux. Colorless crystals precipitate out during cooling to room temperature. The crystals are isolated, washed with acetone and dried. 63 g of reaction product is obtained with a melting point of 255°–263° C.

5. Manufacture of the Preforming Material

In a laboratory mixer at room temperature, 50 g of powdered bicyclo[2.2.2]-2,3:5,6-dibenzooctadiene-2,5-dicarboxylic acid-7,8-anhydride is tumbled with 2 kg of the mixture according to 3 above.

The granular material treated in this manner is remelted in a double screw kneader at 290° C., ribbon granulated and dried.

COMPARISON TEST A 20 g of maleic anhydride are admixed to 2 kg of PPE according to Example 1.1 in a double screw kneader at a melt temperature of 290° C. Subsequently, it is granulated and dried.

COMPARISON TEST B

Analogously to Example A, 20 g of maleic anhydride and 10 g of dicumylperoxide are admixed to 2 kg of PPE.

6. Molding Materials (Examples 7–9, C–E)

The preforming materials are produced according to 4 above, A and B are mixed with polyamides in amounts shown in the table, and are then remelted, ribbon granulated and dried. The product is injected to form standard elements, and then tested.

A comparison of the results the Tests 7–9 with those of the comparison tests C–E shows the excellent dispersion of the PPE phase into the polyamide matrix, as well as the significantly improved notched bar impact strength.

TABLE
Composition and Characteristics of the Molding Material

| Test | Composition (% by weight) | Preforming Material (according to test no.) | Polyamide (% by weight) | $a_K$ (kJ/M$^2$) | Epsilon$_R$ (%) | Vicat temp. (°C.) B/50 | Linear Average$^d$ |
|---|---|---|---|---|---|---|---|
| 7 | 40 | 4 | 60$^a$ | 57 | 62 | 156 | 1.1 |
| 8 | 40 | 4 | 60$^b$ | 22 | 48 | 195 | 1.4 |
| 9 | 40 | 4 | 60$^c$ | 14 | 52 | 212 | 1.6 |
| C | 40 | A | 50$^a$ | 4 | 3 | 159 | 9.7 |
| D | 40 | B | 60$^a$ | 4 | 6 | 156 | 8.2 |
| E | 40 | B | 60$^b$ | 4 | 15 | 195 | 8.8 |

$^a$VESTAMID ® L 1901 (Huels A.G.) = PA 12
$^b$ULTRAMID ® B 4 (BASF A.G.) = PA 6
$^c$ULTRAMID ® A 4 (BASF A.G.) = PA 66
$^d$linear average of the volume distribution of the PPE particles in the polyamide matrix (μm)

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic material, comprising:
   (a) 5–85 parts by weight of a melted preforming material comprising
      (i) 60–98 parts by weight of a polyphenylene ether,
      (ii) 40–2 parts by weight of a polyoctenylene, and
      (iii) 1–7.5 parts by weight of bicyclo[2.2.2]-2,3:5,6-dibenzooctadiene-2,5-dicarboxylic acid-7,8-anhydride, and
   (b) 95–15 parts by weight of a polyamide comprising an aliphatic homopolyamide or a copolyamide.

2. The thermoplastic material of claim 1, further comprising at least one additive selected from the group consisting of polystyrene resins, flame protection agents, pigments, antistatic agents, stabilizers, processing aids and reinforcing agents.

3. The thermoplastic material of claim 1, comprising 20–50 parts by weight of said preforming material and 80–50 parts by weight of said polyamide.

4. The thermoplastic material of claim 3, wherein said polyphenylene ether is particulate in nature and is dispersed in a matrix of said polyamide, and wherein said polyphenylene ether particles have a linear average volume distribution of less than 2 microns.

5. The thermoplastic material of claim 1, wherein said polyamide is selected from the group consisting of 6-, 46-, 66-, 612-, 11- and 12-polyamides.

6. The thermoplastic material of claim 1, wherein the average molecular weight of said polyamide is greater than 5,000.

7. The thermoplastic material of claim 6, wherein the average molecular weight of said polyamide is above 10,000.

8. The thermoplastic material of claim 1, wherein said polyphenylene ether comprises a polymer of 2,6-dimethylphenol, said polymer having an intrinsic viscosity of 0.3–0.65 cm$^3$/g.

9. The thermoplastic material of claim 1, wherein said polyoctenylene has a viscosity of 50–350 cm$^3$/g determined in a 0.1% solution of toluene.

10. The thermoplastic material of claim 9, wherein said viscosity value is 80–160 cm$^3$/g.

11. The thermoplastic material of claim 1, wherein 55–95% of the carbon-carbon double bond content of said polyoctenylene is in the transform.

12. The thermoplastic material of claim 11, wherein said trans carbon-carbon double bond content is 75–85%.

13. The thermoplastic material of claim 1, wherein said copolyamide comprises predominantly aliphatic monomers.

14. A method for the production of the thermoplastic material according to claim 1, comprising the steps of:
   making a solid mixture of said polyphenylene ether and said polyoctenylene,
   melting together said solid mixture with bicyclo[2.2.2]-2,3:5,6-dibenzooctadiene-2,5-dicarboxylic acid-7,8-anhydride, and
   further melting together the product of said melting step with said polyamide.

15. The method of claim 14, further comprising melting together an additive selected from the group consisting of polystyrene resins, flame protection agents, pigments, antistatic agents, stabilizers, processing aids and reinforcing agents.

* * * * *